(12) United States Patent
Nonni et al.

(10) Patent No.: US 8,560,448 B2
(45) Date of Patent: Oct. 15, 2013

(54) SYSTEM AND METHOD TO INITIATE FUNDING OF MULTIPLE MERCHANT ACCOUNTS

(75) Inventors: Jamie Michael Nonni, Falmouth, ME (US); Robert William Rowan, Portland, ME (US); Patrick Arthur Allen, Scarborough, ME (US)

(73) Assignee: Municipay, LLC, Scarborough, ME (US)

( * ) Notice: Subject to any disclaimer, the term of this patent is extended or adjusted under 35 U.S.C. 154(b) by 911 days.

(21) Appl. No.: 12/346,175

(22) Filed: Dec. 30, 2008

(65) Prior Publication Data
US 2010/0169214 A1 Jul. 1, 2010

(51) Int. Cl.
*G06Q 40/00* (2012.01)
(52) U.S. Cl.
USPC .............................. 705/41; 235/379; 235/380
(58) Field of Classification Search
USPC ..................................... 705/41; 235/379, 380
See application file for complete search history.

(56) References Cited

U.S. PATENT DOCUMENTS

| 3,852,571 | A | * | 12/1974 | Hall et al. ...................... 235/379 |
| 5,557,087 | A | | 9/1996 | Duyck |
| 5,590,038 | A | * | 12/1996 | Pitroda ........................... 705/41 |
| 7,305,355 | B2 | | 12/2007 | Tarvydas et al. |
| 2002/0026348 | A1 | | 2/2002 | Fowler et al. |
| 2006/0167811 | A1 | | 7/2006 | Bhambri et al. |
| 2007/0187491 | A1 | | 8/2007 | Godwin et al. |
| 2010/0153266 | A1 | | 6/2010 | Plunkett et al. |

FOREIGN PATENT DOCUMENTS

GB 2400481 10/2004

OTHER PUBLICATIONS

Managing the Books, http://www.speciality-coffee.com/uploads/featureArticle/2006/0606/0606_managing.asp(1 of 5) [Apr. 11, 2008 5:32:59 PM], pp. 1-5.
Blackboard Transaction System, Optimize Student Payment Convenience, pp. 1-2, 2006.
Americancityandcounty.com, Paying for Parking, Technology Expands Options Beyond Cash and Credit, http://americancityandcounty.com/pubwks/traffic_parking/government_paying_parking_cash/(1 of 8)[Apr. 11, 2008 5:34:15 PM].

* cited by examiner

*Primary Examiner* — Daniel Felten
(74) *Attorney, Agent, or Firm* — Brooks Kushman P.C.

(57) ABSTRACT

A system to initiate funding of a plurality of merchant accounts may include one or more computers configured to receive input specifying at least one payment item having a payment amount, determine a convenience fee based on the at least one payment amount, select a first merchant account based on the at least one specified payment item, and select a second merchant account associated with the convenience fee. The one or more computers may also be configured to receive a single input specifying credit card information, link the payment amount, received credit card information and the first merchant account to form a first transaction, and link the convenience fee, received credit card information and second merchant account to form a second transaction. The one or more computers may further be configured to submit the first and second transactions to a credit card authorization network, receive response data from the credit card authorization network for the first and second transactions indicating whether the first and second transactions are authorized, and generate output representing a receipt for the first and second transactions if the first and second transactions are authorized.

18 Claims, 6 Drawing Sheets

SYSTEM AND METHOD TO INITIATE FUNDING OF MULTIPLE MERCHANT ACCOUNTS

BACKGROUND

The interchange of information and money between parties to credit card transactions may be described by the following steps:

Authorization: A cardholder pays for a purchase and a merchant submits a transaction to an acquirer (acquiring bank). The acquirer verifies the credit card number, transaction type and amount with an issuer (card-issuing bank), and reserves that amount of the cardholder's credit limit for the merchant. An authorization will generate an approval code, which the merchant stores with the transaction.

Batching: Authorized transactions are stored in "batches," which are sent to the acquirer. Batches are typically submitted once per day. If a transaction is not submitted in a batch, the authorization will stay valid for a period determined by the issuer, after which the held amount will be returned back to the cardholder's available credit.

Clearing and Settlement: The acquirer sends the batch transactions through the credit card association, which debits the issuers for payment and credits the acquirer.

Funding: Once the acquirer has been paid, the acquirer pays the merchant. The merchant receives the amount totaling the funds in the batch and will be billed a discount rate(s), which is the fee the merchant pays the acquirer for processing the transaction.

Convenience Fee: Credit card associations allow an offset for the discount rate to be charged for certain types of transactions. This offset may be in the form of a convenience fee charged to the card holder. Such convenience fees may be charged by the merchant or a third party. Government offices, for example, may charge citizens the convenience fee to pass this discount rate cost to them.

SUMMARY

In certain embodiments, a system to initiate funding of a plurality of merchant accounts may include one or more computers configured to receive input specifying at least one payment item having a payment amount, determine a convenience fee based on the at least one payment amount, select a first merchant account based on the at least one specified payment item, and select a second merchant account associated with the convenience fee. The one or more computers may also be configured to receive a single input specifying credit card information, link the payment amount, received credit card information and the first merchant account to form a first transaction, and link the convenience fee, received credit card information and second merchant account to form a second transaction. The one or more computers may further be configured to submit the first and second transactions to a credit card authorization network, receive response data from the credit card authorization network for the first and second transactions indicating whether the first and second transactions are authorized, and generate output representing a receipt for the first and second transactions if the first and second transactions are authorized.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Multiple credit card authorizations for multiple merchant accounts may be processed following an entry of credit card information. By way of example, a citizen may pay local government fees and a convenience fee with a single swipe of their credit card. In this example, the citizen will pay for two items. The first is their local property tax bill ($1000) and the second is a town landfill permit ($15). (A first merchant account will receive funding from these two payments.) The total is $1015. A payment system calculates the convenience fee to be assessed based upon the transaction size (e.g., $12.62). (A second merchant account will receive funding from the convenience fee payment.) The payment system drops all three fees (i.e., tax, landfill, and convenience) into an electronic shopping cart. If the citizen agrees to pay the fees, the payment system prompts the citizen to swipe, a single time, their credit card. The payment system may then process, via an authorization network, the transactions associated with the payments. If the transactions are approved, a receipt (or receipts) may be printed for signature.

Figure 1:
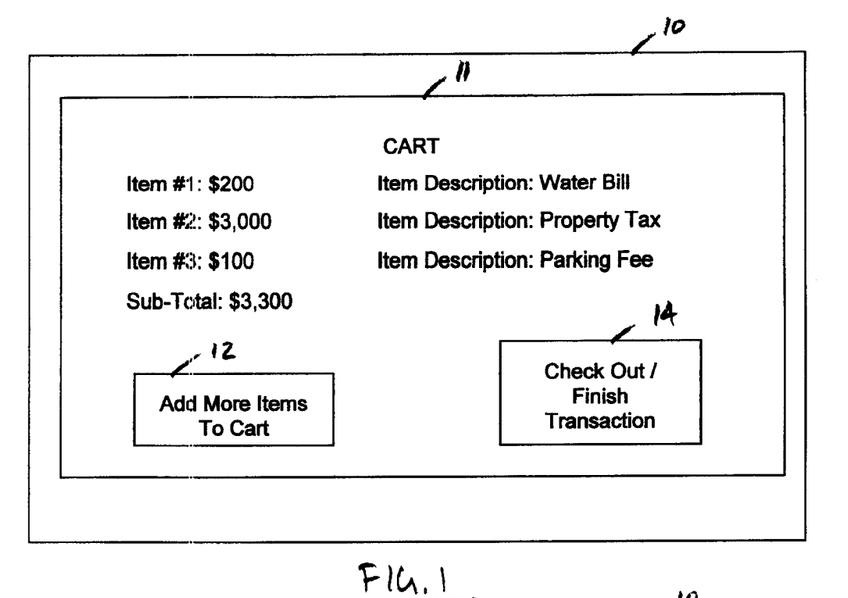
FIG. 1 is a block diagram of an embodiment of a payment system.

Referring now to FIG. 1, an embodiment of a payment system 10 (e.g., a computer operably connected with any suitable communication network, e.g., Internet, etc., having user interfaces such as a keyboard, card reader, touchpad, etc. for receiving user input, and a display 11, printer, etc. for providing output, and configured to perform the techniques described herein) has displayed several example payment items (a $200 water bill, a $3,000 property tax, and a $100 parking fee) selected by a user along with a sub-total ($3,300). Of course, any number of payment items may be selected.

The payment system 10 may include a table stored in memory linking each payment item with a corresponding merchant account. The payment system 10 may thus identify the appropriate merchant account to be funded based on the selected payment item. (Each of the payment items is associated with a "government office" merchant account in this example.) In other embodiments, the user may be prompted to enter merchant account information for each payment item. Other scenarios are also possible.

The payment system 10 of FIG. 1 offers "Add More Items To Cart" and "Check Out/Finish Transaction" buttons 12, 14. As apparent to those of ordinary skill, the "Add More Items To Cart" button 12 allows the user to continue selecting payment items in a known fashion. The "Check Out/Finish Transaction" button 14, as discussed below, allows the user to initiate payment for the selected payment items.

Figure 2:
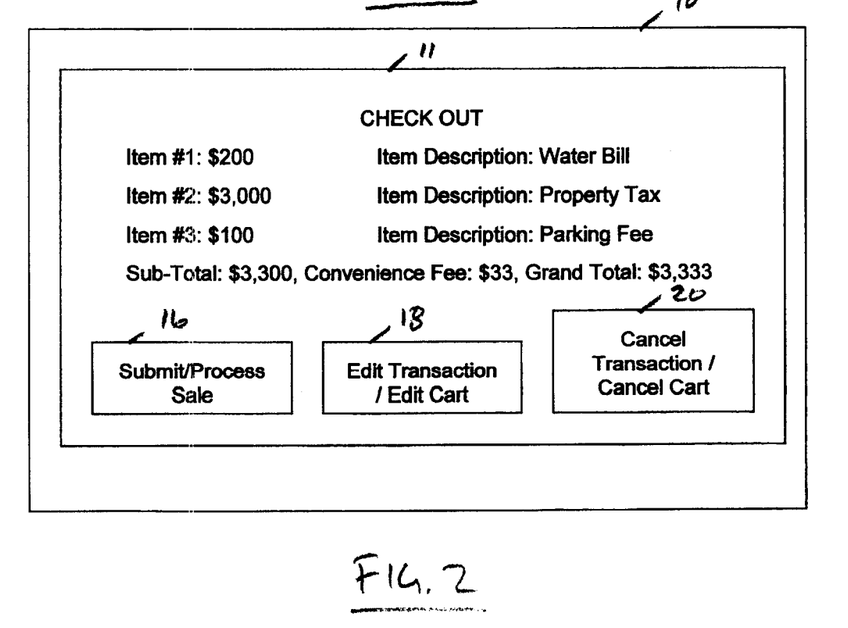
FIG. 2 is another block diagram of the payment system of FIG. 1.

Referring now to FIG. 2, the payment system 10 has calculated and displayed the convenience fee (assumed to be 1% of the sub-total) associated with paying via credit card as well as a grand total (the sum of the sub-total and convenience fee). As mentioned above, the "government office" merchant account is associated with each of the payment items. The convenience fee, however, is associated with a different merchant account ("third party" merchant account). That is, the payment system 10 may identify the "third party" merchant account, for example, via the table discussed above if a convenience fee has been calculated. As a result, the "government office" merchant account is to be funded by payment of the payment items and the "third party" merchant account is to be funded by payment of the convenience fee.

The payment system 10 also offers "Submit/Process Sale," "Edit Transaction/Edit Cart," and "Cancel Transaction/Cancel Cart" buttons 16, 18, 20. The "Edit Transaction/Edit Cart" button 18, when selected, opens the previous screen (illustrated in FIG. 1) to allow the user to edit the payment items. The "Cancel Transaction/Cancel Cart" button 20, when selected, deletes the contents of the electronic "shopping cart" illustrated in FIG. 2, and prompts the user for payment via, for example, check or cash. The "Submit/Process Sale" button 16, as explained below, allows the user to pay the payment items as well as the convenience fee with a single entry (e.g., a single swipe) of their credit card information. Of course, any suitable interactive display scheme may be used.

The user may be prompted to enter their credit card information a single time (via a card swipe, key pad, etc.) after selecting the "Submit/Process Sale" button 16. In one example, the user swipes their credit card once through a card reader associated with the payment system 10.

Authorization requests are sent out for both transactions (i.e., the transaction associated with the "government office" merchant account for $3,300 and the transaction associated with the "third party" merchant account for $33). If the transactions are authorized, the payment system 10 may generate a single receipt for both transactions (or a receipt for each of the transactions). Once the receipt (or receipts) are signed. The payment system 10 may then issue a settlement command, in a known fashion, to facilitate settling of the transactions.

Figure 3:
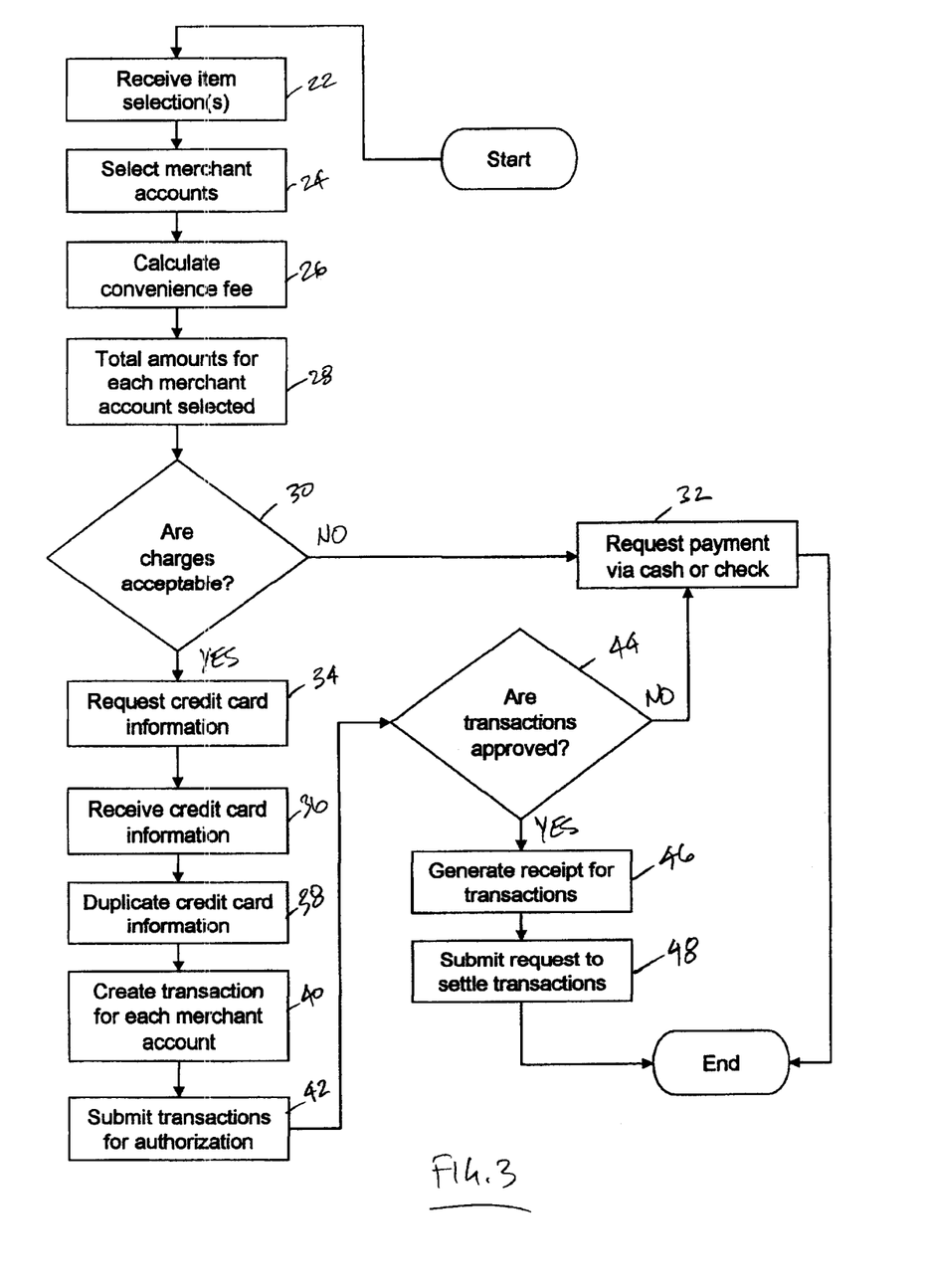
FIG. 3 is a flow chart of an example algorithm for facilitating payment of several merchant accounts.

Referring now to FIG. 3, several payment items are selected as indicated at 22. For example, a user may select a $100 gas bill and $200 water bill from a menu listing a plurality of payment items.

As indicated at 24, merchant accounts are selected. For example, a look-up table mapping payment items with merchant accounts may be referenced to identify the merchant account (or accounts) that are associated with the payment items. Additionally, the merchant account associated with the convenience fee may also be identified. (As such, at least two merchant accounts may be selected.) Alternatively, merchant account information may be entered, etc.

As indicated at 26, a convenience fee is calculated. The convenience fee may be calculated as a percentage of the total value associated with the payment items. The convenience fee may also be a fixed amount assessed per merchant account selected at 24 (e.g., a fixed dollar fee per merchant account).

As indicated at 28, the amounts for each selected merchant account are totaled. For example, $300 may be the total for the "government office" merchant account (associated with the water and gas bill above) and $3 may be the total for the "third party" merchant account (associated with the convenience fee).

As indicated at 30, it is determined whether the charges (e.g., the convenience fee, etc.) are acceptable. If no, payment via cash or check is requested as indicated at 32. For example, the user may be prompted to pay via cash or check thus avoiding the convenience fee. If yes, credit card information is requested as indicated at 34. For example, the user may be prompted to enter their credit card information a single time via, for example, keypad entry, card swipe, menu screen, etc. (As opposed to other systems which require the user to enter their credit card information for each transaction.) The credit card information may include card holder name, card number, expiration date, etc.

As indicated at 36, the credit card information is received.

As indicated at 38, the credit card information is duplicated. For example, an electronic copy of the information is made. The copy may be stored, for example, in memory of the payment system 10 illustrated in FIGS. 1 and 2.

As indicated at 40, transactions are created for each of the merchant accounts selected at 24. For example, the credit card information received at 36 (or created at 38) may be associated with the "government office" merchant account and the $300 total amount to form a first transaction; the credit card information created at 38 (or received at 36) may be associated with the "third party" merchant account and the $3 convenience fee to form a second transaction.

As indicated at 42, the transactions are submitted for authorization. For example, the first and second transactions may be submitted to an authorization network for approval.

As indicated at 44, it is determined whether the transactions are approved. For example, truncated response data authorizing or rejecting the transactions may be received by the payment system 10 illustrated in FIGS. 1 and 2. If no, payment via cash or check is requested as indicated at 32. If yes, a receipt is generated for the transactions as indicated at 46. For example, a single receipt listing all the transactions may be generated. Alternatively, a separate receipt for each of the transactions may be generated, etc.

As indicated at 48, a request to settle the transactions may then be submitted. For example, a command may be issued to settle the transactions after the receipt (or receipts) have been signed. Other scenarios are also possible.

Figure 4:
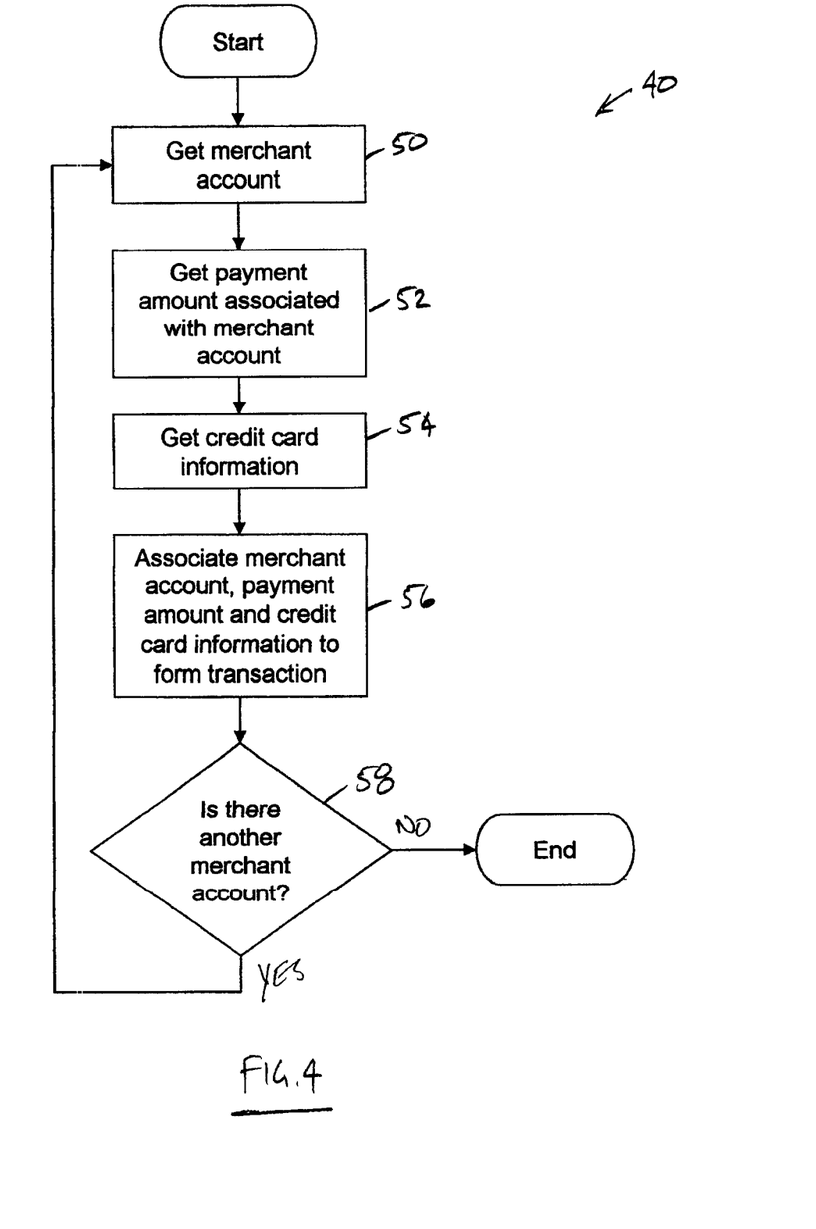
FIG. 4 is a flow chart depicting a portion of the algorithm of FIG. 3.

Referring now to FIGS. 3 and 4, merchant account information is retrieved as indicated at 50. For example, a thread or process created for a transaction may retrieve the "government office" merchant account information. As indicated at 52, a payment amount associated with the merchant account is retrieved. For example, the thread or process may retrieve the $300 payment amount for the "government office" merchant account. As indicated at 54, credit card information is retrieved. For example, the thread or process may retrieve credit card information received at 36 of FIG. 3. As indicated at 56, the merchant account, payment amount and credit card information is associated together to form a transaction. For example, the thread may link the "government office" merchant account with the $300 payment amount and credit card information retrieved at 54 to define a transaction. As indicated at 58, it is determined whether there is another merchant account. For example, the merchant accounts selected at 24 of FIG. 3 may be inspected to determine if there are accounts other than the "government office" merchant account. If yes, merchant account information is retrieved as indicated at 50, etc.

Figure 5:
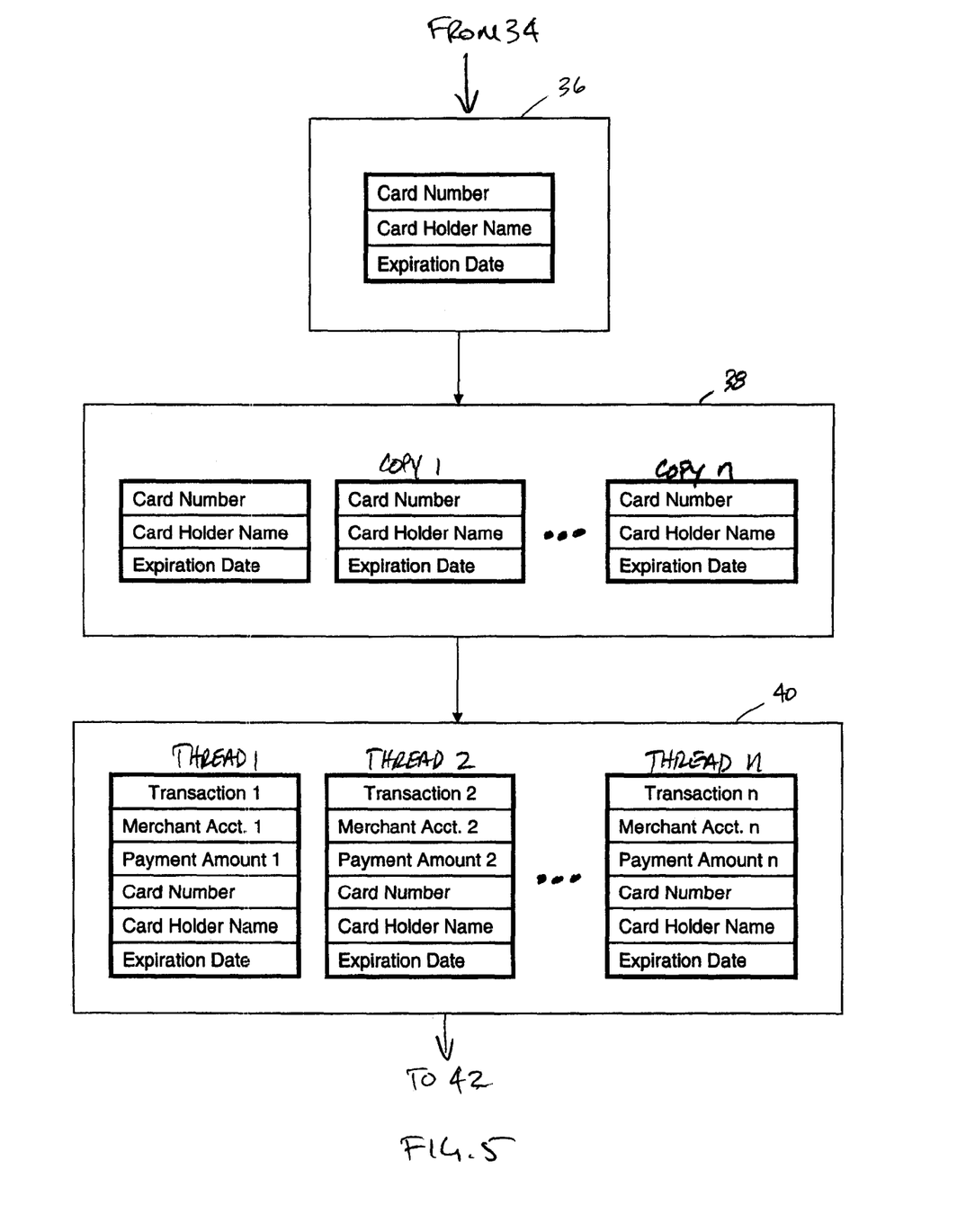
FIG. 5 is another flow chart depicting a portion of the algorithm of FIG. 3.

Referring now to FIGS. 3 and 5, information such as credit card number, card holder name and card expiration date may be received as indicated at 36. As discussed above, this information may be received by way of a single user input such as a card swipe, keypad entry, etc. That is, the card number, expiration date, etc., for example, are input only once even though there may be multiple merchant accounts (multiple transactions) to be funded. In some embodiments, a master thread or process, having knowledge of the payment amounts and merchant accounts to be funded, may wait and receive such credit card information. As discussed below, this master thread or process may then spawn other threads and/or processes for each of the transactions.

Copies of the information received at 36 are created as indicated at 38. In the example illustrated, n copies of the information received at 36 are created. (n may, for example, be equal to the number of merchant accounts selected at 24. n may also, for example, be equal to one minus the number of merchant accounts selected at 24.) Of course, any number of copies may be made.

Threads or processes, for example, handling each of the transactions may be created as indicated at 40. Each of the threads or processes includes, in this example, information regarding a merchant account selected at 24, a payment amount associated with the merchant account, and a credit card received at 38. Each thread or process corresponds to a particular transaction. When a thread or process is created, it may be provided (by the master thread or process discussed above) the merchant account, payment amount and credit card information discussed above. The master thread or process may then activate the spawned threads or processes to seek approval for the transactions as indicated at 42 (and subsequently destroy its credit card information. Once approval is sought, the spawned threads may also then, for example, destroy their credit card information.)

Figure 6:
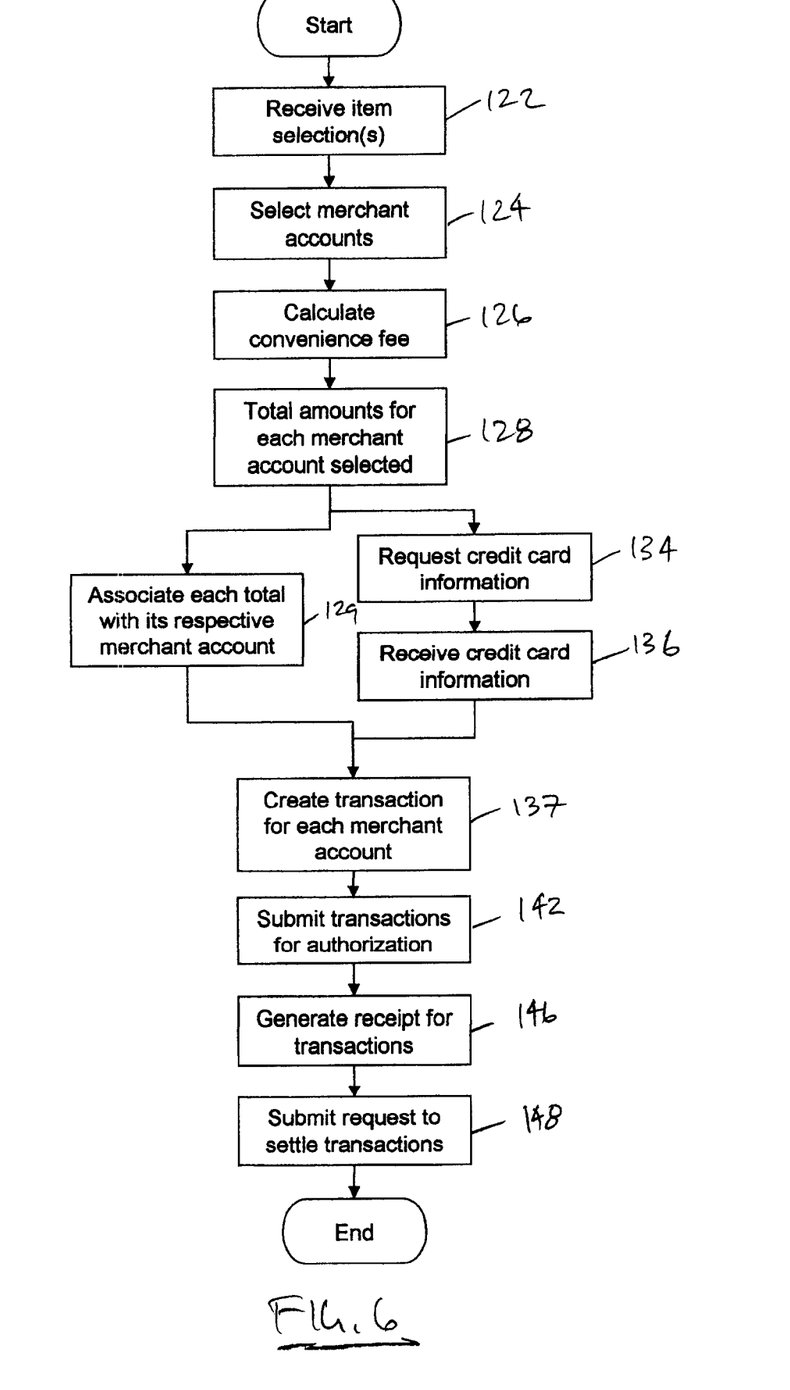
FIG. 6 is a flow chart of another example algorithm for facilitating payment of several merchant accounts.

Referring now to FIG. 6, numbered elements that differ by 100 relative to the numbered elements of FIG. 3 have similar descriptions to the numbered elements of FIG. 3. As indicated at 129, each payment total is associated with its merchant account. Continuing with the example discussed with reference to FIG. 3, the $300 total for the gas and water bill may be linked with the "government office" merchant account via, for example, execution of a thread or process tasked with forming a first transaction. Similarly, the $3 convenience fee may be linked with the "third party" merchant account via execution of another thread or process tasked with forming a second transaction.

As indicated at 137, transactions are created for each merchant account. For example, the threads or processes discussed previously may each wait for the credit card information received at 136. This information may then be supplied to each of the threads waiting for such information.

Figure 7:
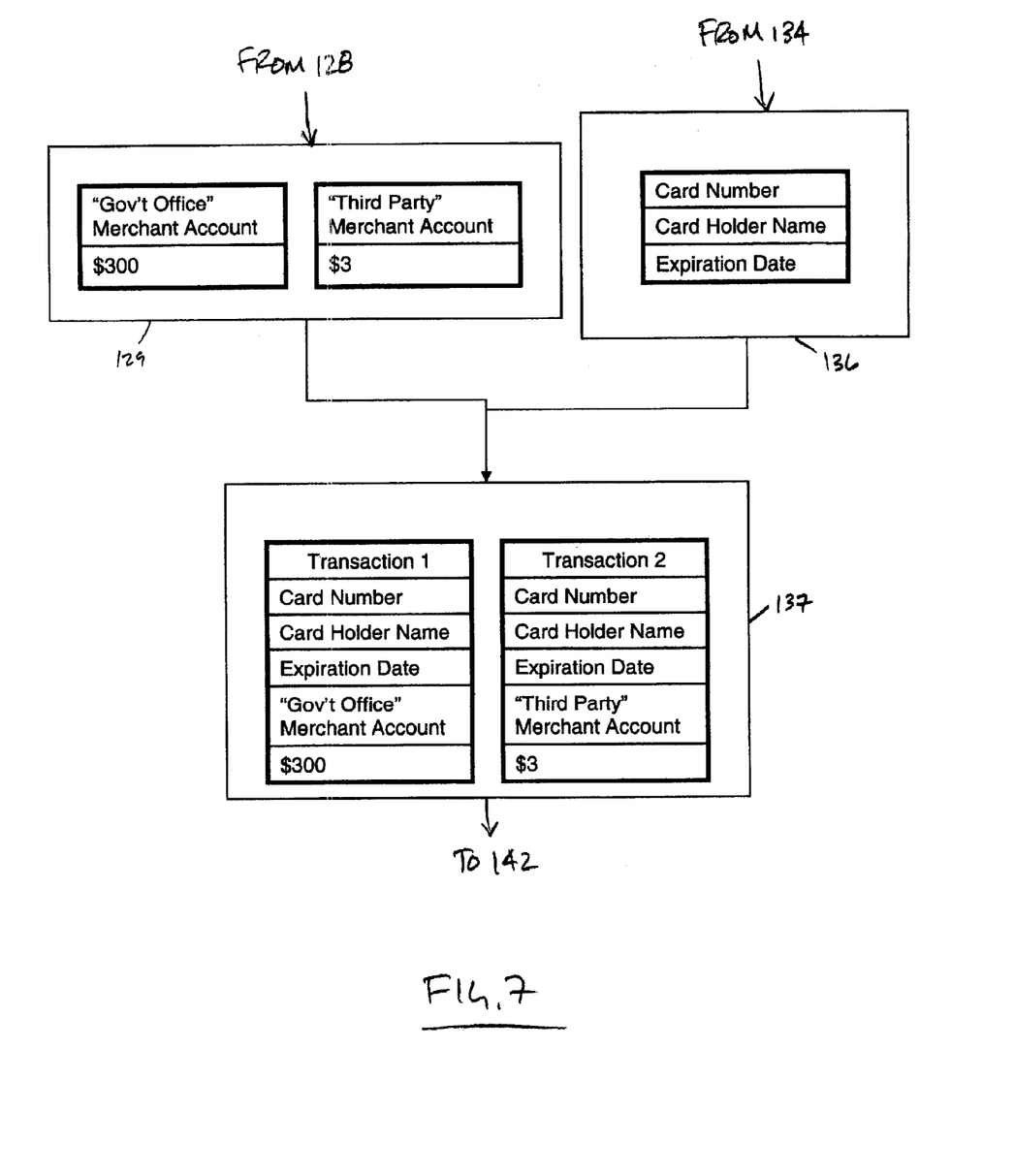
FIG. 7 is flow chart depicting a portion of the algorithm of FIG. 6.

Referring now to FIGS. 6 and 7, the "government office" merchant account has been associated with the $300 payment amount for the gas and water bills discussed above and the "third party" merchant account has been associated with the $3 convenience fee as indicated at 129. A credit card number, card holder name and card expiration date has been received as indicated at 136. As indicated at 137, the "government office" merchant account, $300 payment amount and credit card information has been packaged to form a first transaction, and the "third party" merchant account, $3 payment amount and credit card information has been packaged to form a second transaction.

As apparent to those of ordinary skill, the algorithms disclosed herein may be deliverable to a processing device in many forms including, but not limited to, (i) information permanently stored on non-writable storage media such as ROM devices and (ii) information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), state machines, controllers or other hardware components or devices, or a combination of hardware, software and firmware components.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system to initiate funding of a plurality of merchant accounts comprising:
   one or more computers configured to
      receive input specifying at least one payment item having a payment amount;
      determine a convenience fee based on the at least one payment amount;
      select a first merchant account based on the at least one specified payment item;
      select a second merchant account associated with the convenience fee;
      receive a single input specifying credit card information;
      form a first transaction with the payment amount, received credit card information and the first merchant account;
      form a second transaction with the convenience fee, received credit card information and second merchant account;
      submit the first and second transactions to a credit card authorization network;
      receive response data from the credit card authorization network for the first and second transactions indicating whether the first and second transactions are authorized; and
      generate output representing a receipt for the first and second transactions if the first and second transactions are authorized.

2. The system of claim 1 wherein the one or more computers are further configured to submit the first and second transactions to the credit card authorization network after the first and second transactions are formed.

3. The system of claim 1 wherein the one or more computers are further configured to submit a command to the credit card authorization network to settle the first and second transactions.

4. The system of claim 1 wherein the receipt comprises a single receipt.

5. The system of claim 1 wherein the one or more computers are further configured to generate output requesting an alternative form of payment if both the first and second transactions are not authorized.

6. The system of claim 1 wherein the one or more computers are further configured to generate output requesting an alternative form of payment if either of the first and second transactions are not authorized.

7. The system of claim 1 wherein the response data comprises truncated response data.

8. The system of claim 1 wherein the credit card information includes at least one of card number, expiration date and card holder name.

9. The system of claim 1 wherein the one or more computers are further configured to total an amount for each of the first and second merchant accounts.

10. The system of claim 1 wherein the one or more computers are further configured to duplicate at least a portion of the input specifying the credit card information.

11. A system to initiate funding of a plurality of merchant accounts comprising:
one or more computers configured to
receive a set of parameters specifying a credit card account;
generate at least one duplicate set of parameters specifying the credit card account;
define a first transaction to include a payment amount for a payment item, a first merchant account, and one of the sets of parameters specifying the credit card account;
define a second transaction to include a convenience fee, a second merchant account, and one of the sets of parameters specifying the credit card account;
submit the first and second transactions to a credit card authorization network;
receive response data from the credit card authorization network for the first and second transactions indicating whether the first and second transactions are authorized; and
generate output representing a receipt for the first and second transactions if the first and second transactions are authorized.

12. The system of claim 11 wherein the one or more computers are further configured to submit a command to the credit card authorization network to settle the first and second transactions.

13. The system of claim 11 wherein the receipt comprises a single receipt.

14. The system of claim 11 wherein the one or more computers are further configured to generate output requesting an alternative form of payment if both the first and second transactions are not authorized.

15. The system of claim 11 wherein the one or more computers are further configured to generate output requesting an alternative form of payment if either of the first and second transactions are not authorized.

16. The system of claim 11 wherein the response data comprises truncated response data.

17. The system of claim 11 wherein the set of parameters includes at least one of card number, expiration date and card holder name.

18. The system of claim 11 wherein the one or more computers are further configured to total an amount for each of the merchant accounts.

* * * * *